United States Patent
Schmidt et al.

(10) Patent No.: US 9,892,207 B2
(45) Date of Patent: Feb. 13, 2018

(54) AUTOMATIC MIGRATION FOR ON-PREMISE DATA OBJECTS TO ON-DEMAND DATA OBJECTS

(71) Applicants: Olaf Schmidt, Walldorf (DE); Martin P. Fischer, Heidelberg (DE)

(72) Inventors: Olaf Schmidt, Walldorf (DE); Martin P. Fischer, Heidelberg (DE)

(73) Assignee: SAP SE, Walldorf (DE)

(*) Notice: Subject to any disclaimer, the term of this patent is extended or adjusted under 35 U.S.C. 154(b) by 404 days.

(21) Appl. No.: 13/757,158

(22) Filed: Feb. 1, 2013

(65) Prior Publication Data
US 2014/0222756 A1 Aug. 7, 2014

(51) Int. Cl.
*G06F 17/30* (2006.01)

(52) U.S. Cl.
CPC .. *G06F 17/30917* (2013.01); *G06F 17/30303* (2013.01); *G06F 17/30569* (2013.01)

(58) Field of Classification Search
CPC ......... G06F 17/30578; G06F 17/30581; G06F 17/30303; G06F 17/30194; G06F 17/30; G06F 17/30233; G06F 17/30082; G06F 17/30091; G06F 17/30156; G06F 17/30221; G06F 17/30289; G06F 17/30067; G06F 17/301; G06F 17/30126; G06F 17/30162; G06F 17/30171; G06F 17/30174; G06F 17/30182; G06F 17/30575; G06F 17/24; G06F 17/30011; G06F 17/30073; G06F 17/30076; G06F 17/30079; G06F 17/302; G06F 17/30241; G06F 17/30283; G06F 17/30292; G06F 17/30294; G06F 17/303; G06F 17/3033; G06F 17/30371; G06F 17/30554; G06F 17/30557; G06F 17/30587; G06F 17/30619; G06F 17/30657; G06F 17/30705; G06F 17/30949; G06F 11/1448;

(Continued)

(56) References Cited

U.S. PATENT DOCUMENTS 7,222,142 B2   5/2007   Fischer et al.
7,457,933 B2   11/2008  Pferdekamper et al.

(Continued)

*Primary Examiner* — Mark D Featherstone
*Assistant Examiner* — Diedra McQuitery
(74) *Attorney, Agent, or Firm* — Fish & Richardson P.C.

(57) ABSTRACT

Methods, systems, apparatus, and computer programs encoded on computer storage medium for automatically migrating on-premise data objects used by an on-premise application to on-demand data objects used by an on-demand application including retrieving mapping rules corresponding to the on-premise data objects from a rule repository; extracting data corresponding to on-premise data objects that are affected during execution of the on-premise application, the on-premise application being executed within an on-premise computing environment, the data being stored in an on-premise database based on an on-premise database schema; generating an export file comprising the data; generating an import file based on the export file and the mapping rules, the import file comprising the data; and providing the import file to an on-demand computing environment that hosts the on-demand application, the import file being process-able by the on-demand computing environment to write the data from the import file into an on-demand database.

20 Claims, 4 Drawing Sheets

(58) Field of Classification Search
CPC ............ G06F 11/1464; G06F 11/1471; G06F 11/203; G06F 11/3433; G06F 11/1461; G06F 13/382; G06F 15/16; G06F 15/177; G06F 3/065; G06F 3/067; G06F 3/0683; G06F 3/0617; G06F 3/0605; G06F 3/0604; G06F 3/0649; G06F 3/0689; G06F 3/06; G06F 3/061; G06F 3/0611; G06F 3/0619; G06F 3/0631; G06F 3/0635; G06F 3/0643; G06F 3/0653; G06F 3/0667; G06F 3/048; G06F 3/0481; G06F 3/0613; G06F 3/062; G06F 3/064; G06F 3/0647; G06F 1/3212; G06F 1/3234; G06F 12/00; G06F 12/1036; G06F 12/109; G06F 12/145; G06F 12/02; G06F 12/0246; G06F 12/06; G06F 12/08; G06F 12/0804; G06F 12/084; G06F 12/0866; G06F 12/12; G06F 12/14; G06F 12/1425; G06F 8/65; G06F 8/60; G06F 21/6218; G06F 21/41; G06F 21/552; G06F 21/561; G06F 21/60; G06F 21/6209; G06F 21/6272; G06F 21/78; G06F 21/00; G06F 21/604; G06F 2009/45562; G06F 2221/2147; G06F 2221/2151; G06F 2221/2111; G06F 8/61; G06F 8/62; G06F 9/455; G06F 9/4443; G06F 9/5083; G06F 9/44; G06F 9/45558; G06F 9/4856; G06F 9/5061; G06F 9/5077; G06F 9/5088; G06F 9/52; G06F 11/008; G06F 11/0793; G06F 11/14; G06F 11/1446

USPC .......... 707/827, 649, 634, 679, 692, E17.01, 707/694, 698, 722, 822, 823, E17.005, 707/E17.014, E17.032, E17.044, 609, 707/610, 624, 635, 639, 640, 644, 645, 707/646, 652, 654, 661, 667, 673, 687, 707/693, 736, 737, 741, 747, 756, 797, 707/821; 709/203, 219, 213, 217, 223, 709/226, 206, 212, 220, 221, 224, 230; 711/162, 170, 154, E12.001, E12.008, 711/E12.017, E12.069, E12.084, E12.092, 711/103, 114, 118, 158, 163, 166; 700/275, 11, 17, 2, 232; 715/255, 207, 715/853; 718/1; 705/14.4, 14.61, 14.64, 705/14.66; 717/110, 121, 170, 172, 173, 717/176

See application file for complete search history.

(56) References Cited

U.S. PATENT DOCUMENTS

| | | | |
|---|---|---|---|
| 7,536,673 | B2 | 5/2009 | Brendle et al. |
| 7,653,667 | B2 | 1/2010 | Pferdekamper et al. |
| 7,693,881 | B2 | 4/2010 | Fischer et al. |
| 7,693,890 | B2 | 4/2010 | Fischer et al. |
| 7,707,176 | B2 | 4/2010 | Schmidt |
| 7,756,813 | B2 | 7/2010 | Pferdekamper et al. |
| 7,827,160 | B2 | 11/2010 | Kuhr et al. |
| 7,844,890 | B2 | 11/2010 | Schmidt |
| 7,844,957 | B2 | 11/2010 | Doucette et al. |
| 7,975,013 | B2 | 7/2011 | Schmidt |
| 8,046,540 | B2 | 10/2011 | Smits et al. |
| 8,090,754 | B2 | 1/2012 | Schmidt et al. |
| 8,219,974 | B2 | 7/2012 | Schmidt |
| 8,285,681 | B2 * | 10/2012 | Prahlad et al. ............... 707/640 |
| 8,601,495 | B2 | 12/2013 | Bezukov |
| 8,606,878 | B2 | 12/2013 | Ferris |
| 8,626,799 | B2 | 1/2014 | Bahl et al. |
| 8,694,653 | B2 | 4/2014 | Wood et al. |
| 8,732,595 | B2 | 5/2014 | Schmidt et al. |
| 8,732,664 | B2 | 5/2014 | Altin |
| 8,739,124 | B2 | 5/2014 | Ritter et al. |
| 2003/0074386 | A1 * | 4/2003 | Schmidt ................ G06F 9/4451 718/1 |
| 2003/0208505 | A1 * | 11/2003 | Mullins ............. G06F 17/30607 |
| 2007/0299975 | A1 | 12/2007 | Daschakowsky et al. |
| 2008/0154994 | A1 | 6/2008 | Fischer et al. |
| 2008/0154997 | A1 | 6/2008 | Schmidt |
| 2008/0243781 | A1 | 10/2008 | Kuhr et al. |
| 2008/0263007 | A1 | 10/2008 | Schmidt |
| 2009/0150168 | A1 | 6/2009 | Schmidt |
| 2009/0150431 | A1 | 6/2009 | Schmidt et al. |
| 2009/0150866 | A1 | 6/2009 | Schmidt |
| 2009/0150906 | A1 | 6/2009 | Schmidt et al. |
| 2010/0287553 | A1 | 11/2010 | Schmidt et al. |
| 2010/0332401 | A1 * | 12/2010 | Prahlad et al. .................. 705/80 |
| 2011/0321058 | A1 | 12/2011 | Schmidt |
| 2012/0030180 | A1 | 2/2012 | Klevenz et al. |
| 2012/0084254 | A1 * | 4/2012 | Richards et al. ............. 707/609 |
| 2012/0151061 | A1 * | 6/2012 | Bartfai-Walcott et al. ... 709/226 |
| 2012/0246130 | A1 | 9/2012 | Schmidt |
| 2012/0259909 | A1 * | 10/2012 | Bachelor et al. ............. 709/201 |
| 2012/0281708 | A1 | 11/2012 | Chauhan et al. |
| 2012/0324069 | A1 | 12/2012 | Nori et al. |
| 2013/0018926 | A1 | 1/2013 | Schmidt et al. |
| 2013/0091285 | A1 * | 4/2013 | Devarakonda et al. ...... 709/226 |
| 2014/0047107 | A1 | 2/2014 | Maturana et al. |

* cited by examiner

AUTOMATIC MIGRATION FOR ON-PREMISE DATA OBJECTS TO ON-DEMAND DATA OBJECTS

BACKGROUND

Cloud computing is an emerging technology that has the potential to be used widely for business applications. Cloud computing can offer enterprises the opportunity to significantly reduce the total cost of ownership (TCO) of business applications by using various cloud services. Thus, there is a demand to migrate these business applications to cloud based services/applications in order to reduce related costs (e.g. IT-staff, maintenance, hardware, etc.).

SUMMARY

Implementations of the present disclosure include computer-implemented methods for automatically migrating on-premise data objects used by an on-premise application to on-demand data objects used by an on-demand application. In some implementations, actions include retrieving mapping rules corresponding to the on-premise data objects, the mapping rules being retrieved from a rule repository; extracting, by one or more processors, data corresponding to on-premise data objects that are affected during execution of the on-premise application, the on-premise application being executed within an on-premise computing environment, the data being stored in an on-premise database based on an on-premise database schema; generating, by the one or more processors, an export file, the export file including the data; generating, by the one or more processors, an import file based on the export file and the mapping rules, the import file including the data; and providing the import file to an on-demand computing environment that hosts the on-demand application, the import file being process-able by the on-demand computing environment to write the data from the import file into an on-demand database.

In some implementations, the mapping rules map fields of on-premise data objects to fields of on-demand data objects.

In some implementations, generating the import file includes parsing the data provided in the export file, and mapping the data based on the mapping rules.

In some implementations, actions further include Identifying, by the one or more processors, on-premise data object models corresponding to the on-premise data objects, defining the mapping rules to map fields of the on-premise data object models to fields of corresponding on-demand data object models, and storing the mapping rules in the rule repository.

In some implementations, extracting data is achieved based on a schema mapping that maps fields of the on-premise database to fields of the on-premise objects based on the on-premise database schema.

In some implementations, the data is written to the on-premise database based on a schema mapping that maps fields of the on-demand data objects to fields of the on-demand database based on an on-demand database schema.

In some implementations, the on-premise application embodies a business process of an enterprise, the business process including one or more tasks, at least one task affecting an on-premise data object.

In some implementations, the on-premise computing environment is operated and maintained by an enterprise.

In some implementations, the on-demand computing environment is operated and maintained by a service provider.

In some implementations, an on-premise data object is affected during execution of the on-premise application when data is one or more of stored to and read from the on-premise data object.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the

DESCRIPTION OF DRAWINGS

Like reference symbols in the various drawings indicate like elements.

DETAILED DESCRIPTION

Implementations of the present disclosure are generally directed to migration of on-premise data objects to on-demand data objects. In some implementations, an on-premise application (e.g., locally-accessible) accesses data stored by an on-premise database (e.g., "legacy" data). In some examples, an on-premise application is a computer-executable application that is locally executed by an enterprise. For example, the on-premise application can be provided as one or more computer-executable programs that are executed using computing devices that are operated by the enterprise (e.g., a company). In some examples, an on-demand application is a computer-executable application that is provided by a service provider and that is remotely accessed by one or more enterprises. For example, the on-demand application can be provided as one or more computer-executable programs that are executed using computing devices that are operated by the service provider (e.g., a cloud service provider), the on-demand application being accessed by one or more enterprises (e.g., over a network).

In some examples, an enterprise seeks to switch from an on-premise application to an on-demand application. In this manner, the enterprise is able to reduce costs, as the enterprise no longer has the burden of operating and maintaining the on-premise application. Instead, the service provider operates and maintains the on-demand application. In some instances, for example, data structures of the on-demand application are different from data structures of the on-premise application, resulting in a risk of previously stored on-premise data being unusable with the on-demand application.

Accordingly, implementations of the present disclosure enable migration of on-premise data (e.g., stored by an on-premise database of the enterprise) to on-demand data (e.g., stored by an on-demand database provided by the service provider). In this manner, legacy data used by the enterprise is not lost when moving from the on-premise application to the on-demand application. For example, on-premise business objects (e.g., implemented by a business process of the on-premise application) can access data stored by the on-premise database using a first mapping. In some examples, the on-premise business objects are extracted, including extraction of the data accessed by the on-premise business objects. The on-premise business objects are mapped to on-demand business objects, including a second mapping between attributes (based on the data) of the on-premise business objects and the on-demand business objects. Additionally, the attributes of the on-demand business objects are mapped to an on-demand database using a third mapping. An on-demand application (e.g., cloud-based application) can access the data stored in the on-demand database.

Implementations of the present disclosure will be described in further detail herein with reference to an example context. The example context includes migration from an on-premise business application to an on-demand business application. In the example context, data objects, provided as business objects, that are used by an on-premise business application are identified and are migrated for use with an on-demand business application. However, implementations of the present disclosure are applicable in other contexts, such as non-business applications that use non-business data objects.

Figure 1:
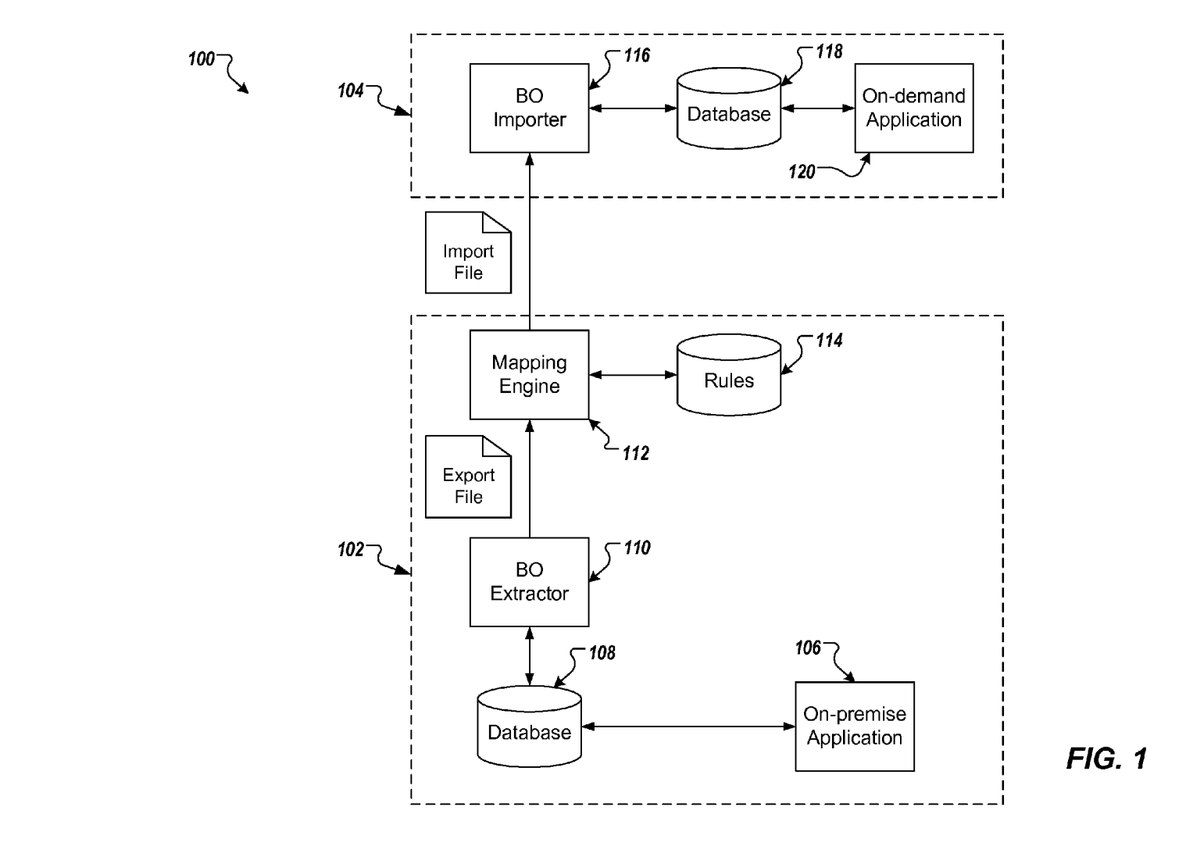
FIG. 1 depicts an example system in accordance with implementations of the present disclosure.

FIG. 1 illustrates a computing system 100 that includes an on-premise computing environment 102 and an on-demand computing environment 104. In some implementations, the on-premise computing environment 102 is local to an enterprise. For example, the on-premise computing environment 102 may (physically) reside or be under the control of the enterprise (e.g., a company) that owns and operates the on-premise computing environment 102. The on-demand environment 104 can include a BO importer 116, an on-demand database 118, and an on-demand application 120.

In some examples, the on-demand computing environment 104 is a distributed ("cloud") computing environment that is operated by a service provider. In some examples, the on-demand computing environment 104 is remote from the on-premise computing environment 102 operated by the enterprise. In some examples, the on-demand computing environment 104 can be (physically) inaccessible to by a user of the on-premise computing environment 102. In some examples, the on-demand computing environment 104 can be geographically remote from the on-premise computing environment 102.

In some examples, the on-premise computing environment 102 can include an on-premise application 106, an on-premise database 108, a business object (BO) extractor 110, a mapping engine 112, and a rules database 114. In some examples, the on-demand computing environment 104 can include the mapping engine 112 and the rules database 114. In some examples, the mapping engine 112 and the rules database 114 can be distributed between the on-premise computing environment 102 and the on-demand computing environment 104.

In some examples, the on-premise application 106 is any appropriate type of application that processes data retrieved from the database 108 and/or that stores data to the database 108. Although depicted as a single application, the on-premise application 106 may be implemented as one or more applications that are executed in the on-premise computing environment 102.

In some implementations, a business process is embodied in the on-premise business application 106. One or more business objects (BOs) can be associated with the business process. In some examples, BOs can be manipulated during execution of the business process. In the example context, the on-premise application 106 can include a service-based business process such as a sales order business process, for example. The example sales order business process can include an order sub-process, a billing sub-process and a shipping sub-process. In the example context, a sales order object (e.g., sales order BO) can be provided and can be linked to multiple sales item objects (e.g., sales item BOs). Actions can be provided and can be controlled by business constraints. In some examples, each action can move the sales order BO through the order sub-process, the billing sub-process and the shipping sub-process.

In some examples, each BO can be provided based on an object model that describes static features or components associated with the BO and/or dependencies between the BO and other BOs. In some examples, a BO can include attributes or variables. In some examples, attributes are initialized at the time of instantiation of the BO and can assume different values during the business process that acts on the BO. In the example context, the sales order BO in the sales order business process can include attributes such as Order ID, number of order items, and delivery date.

In some examples, the on-premise database 108 stores attribute data associated with the business process, and particularly, the business objects. The business objects include one or more fields. The one or more fields are populated (e.g., at runtime) with corresponding attribute data from the on-premise database 108. For example, the on-premise application 106 accesses the on-premise database 108 in response to execution of the business process, and particularly, such that the BOs associated with business process are populated with associated attribute data. In some examples, the on-premise database 108 stores the attribute data of the on-premise BO according to a first schema. In some examples, the on-premise database 108 is an in-memory repository.

In accordance with implementations of the present disclosure, the on-premise computing environment 102 can support migration from the on-premise application 106 to the on-demand application 120 of the on-demand computing environment 104. For example, the enterprise that operates and maintains the on-premise application 106 can decide that instead of using the on-premise application 106 to support operations of the enterprise (e.g., sales order processing), the enterprise will use the on-demand application 120 provided by the provider of the on-demand computing environment 104. To that end, the enterprise migrates the on-premise data stored in the database 108 for storage in the on-demand database 118 and use with the on-demand application 120. In accordance with implementations of the present disclosure, the on-premise computing environment can include the BO extractor 110, the mapping engine 112 and the rules database 114. Although the BO extractor 110, the mapping engine 112 and the rules repository 114 are depicted as part of the on-premise computing environment 102, it is appreciated that the BO extractor 110, the mapping engine 112 and the rules repository 114 can be provided as part of the on-demand computing environment 104 or can be provided by a third-party service provider.

In some implementations, the BO extractor 110 extracts the BOs associated with the business process, and the attribute data of the BOs associated with the business process. For example, the business process can be examined and the BOs that are affected by the business process can be identified. In some examples, the BO extractor 110 extracts the BOs and generates an extensible markup language (XML) file based on the extracted BOs. In some examples, the BO extractor 110 generates the XML file to include the attribute data associated with the BOs associated with the business process.

In some implementations, the mapping engine 112 maps the extracted, on-premise BOs to on-demand BOs. In some examples, the mapping engine 112 accesses the rules database 114 to obtain one or more rules regarding mapping of the on-premise BO fields to the on-demand BO fields. For example, the mapping engine 112 processes (e.g., analyzes) the XML file and identifies one or more rules (e.g., a rule set) associated with the XML file from the rules database 114. The mapping engine 112 applies the one or more associated rules to the on-premise BO (e.g., the XML file) to map the on-premise BO to a corresponding on-demand BO. In some examples, the mapping engine 112 applies the one or more associated rules to the on-premise BO such that one or more fields of the on-premise BO are mapped to one or more fields of the on-demand BO. Thus, the attributes associated with the fields of the on-premise BO are mapped to the corresponding fields of the on-demand BO. In some examples, the mapping engine 112 serializes the mapped data into an import file (e.g., an XML file).

In some examples, one field of the on-premise BO may be mapped to two or more fields of the on-demand BO. In some examples, two or more fields of the on-premise BO may be mapped to one field of the on-demand BO. In some examples, the one or more rules associated with the on-premise BO are based on the on-premise BO. For example, the one or more rules are specific for the particular on-premise BO. In some examples, the one or more rules are based on the on-demand environment 104. For example, the one or more rules are specific for the on-demand environment 104 (and an on-demand application).

In some implementations, first mapping rules are defined to map on-premise BOs to the corresponding on-premise database schema. In some examples, the first mapping rules are pre-defined. For example, the first mapping rules can be provided as part of the on-premise application 106 to enable retrieval of data from the database 108 during execution of the on-premise application 106. In some implementations, second mapping rules are defined to map fields of on-premise BOs to corresponding fields on on-demand BOs. For example, the second mapping can be provided as part of a migration process for moving from the on-premise application 106 to the on-demand application 120. In some implementations, third mapping rules are defined to map on-demand BOs to the corresponding on-demand database schema. In some examples, the third mapping rules are pre-defined. For example, the third mapping rules can be provided as part of the on-demand application 120 to enable retrieval of data from the database 118 during execution of the on-demand application 120. Each of the first, second and third mapping rules can be persisted in the rules repository 114.

In some implementations, the BO importer 116 imports the on-premise BOs to provide corresponding on-demand BOs that can be affected by the on-demand application 120. For example, the BO importer 116 receives the import file form the mapping engine 112 and generates corresponding on-demand BOs based on the data provided in the import file. For example, the BO importer 116 parses the import file and maps the BOs according to third mapping rules (e.g., mapping on-demand BOs to the on-demand database schema of the database 118) and writes the data into the on-demand database.

The on-demand database 118 stores the attribute data associated with the on-demand BO. In some examples, the BO importer 116 maps the data of the on-demand BO to the on-demand database 118 according to a second schema. In some examples, the second schema differs from the first schema of the on-premise database 108. For example, the BO importer 116 maps the fields of the on-demand BO to the on-demand database 118 such that the attributes associated with the fields is stored by the on-demand database 118 according to the second schema. In some examples, the on-premise database 118 is an in-memory repository.

In some examples, the on-demand application 120 is an application hosted on the on-demand environment 104. The on-demand application 120 accesses the on-demand database 118 in response to execution of an on-demand business process, to populate the BOs associated with on-demand business process with associated attribute data of the on-demand database 118. In some examples, the on-demand business process supplants the on-premise business process. In some examples, the on-demand business process differs from the on-premise business process. In some examples, the on-demand business process and the on-premise business process provide a similar (or same) result (e.g., sales order processing). The on-demand application 120 is interacts with the on-demand BO, similar to that mentioned above with respect to the on-premise application 106 interacting with the on-premise BO.

Figure 2:
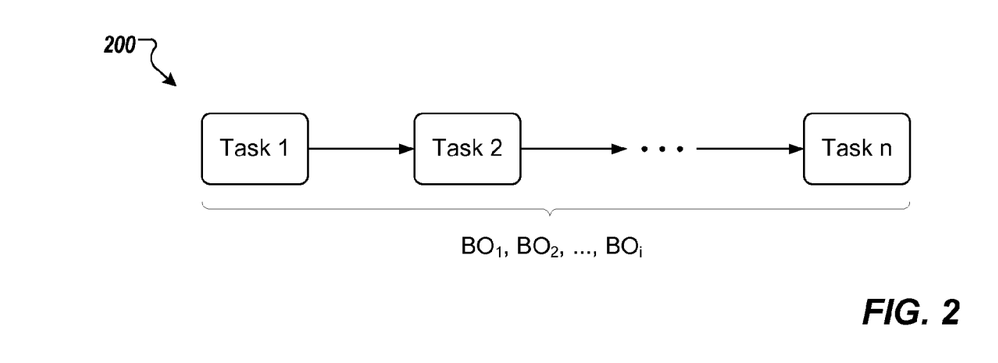
FIG. 2 depicts a generic business process.

FIG. 2 illustrates a generic business process 200 that can be embodied by the on-premise business process 106 and/or the on-demand business process 120. The generic business process 200 is associated with (e.g., includes) one or more tasks (e.g., Task 1, Task 2, . . . , Task n) and accesses one or more business objects (e.g., $BO_1$, $BO_2$, . . . , $BO_i$) during execution of the tasks. For example, each task may access one or more business objects, and the attributes (data) associated with the one or more business objects (e.g., from the on-premise database and/or the on-demand database).

In some examples, a task (e.g., Task 1, Task 2, . . . , Task n) is associated with two or more business objects (e.g., $BO_1$, $BO_2$, . . . , $BO_i$). In some examples, a business object (e.g., $BO_1$, $BO_2$, . . . , $BO_i$) is associated with two or more tasks (e.g., Task 1, Task 2, . . . , Task n).

Figure 3:
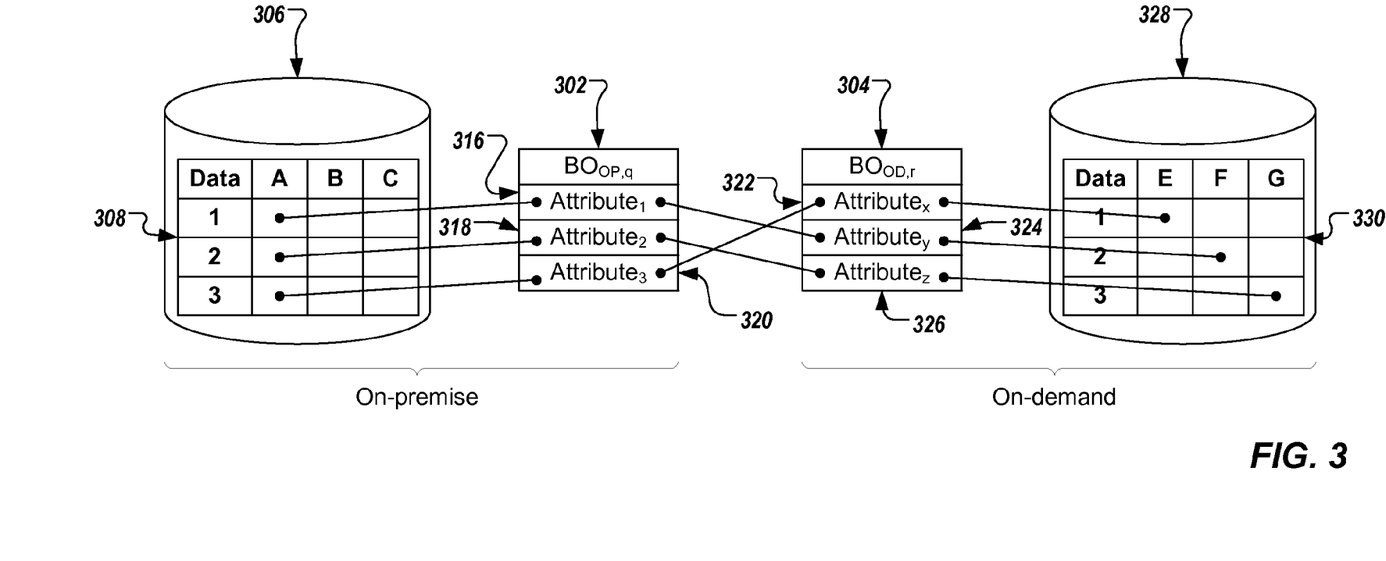
FIG. 3 illustrates a mapping between an on-premise business object and a corresponding on-demand business object.

FIG. 3 illustrates a mapping between an on-premise business object ($BO_{OP,q}$) 302 and a corresponding on-demand business object ($BO_{OD,r}$) 304. For example, the on-premise business object ($BO_{OP,q}$) 302 and the on-demand business object ($BO_{OD,r}$) 304 are one of $BO_1$, $BO_2$, . . . , $BO_i$ of FIG. 2.

In some examples, the mapping between the on-premise business object ($BO_{OP,q}$) 302 and the corresponding on-demand business object ($BO_{OD,r}$) 304 includes at least three separate mappings.

In some examples, a first mapping can include a mapping between an on-premise database 306 (e.g., the on-premise database 108) to the on-premise business object ($BO_{OP,q}$) 302, and particularly, a mapping between the data of the on-premise database 306 to the fields of the on-premise business object ($BO_{OP,q}$) 302, according to a first schema associated with the on-premise database 306. For example, the on-premise database 306 includes a data table 308 associated with the first schema. As illustrated, the table 308 includes data fields A1, A2, A3, B1, B2, B3, C1, C2, and C3. Each of the data fields can be associated with one more contents of data (e.g., attributes). The on-premise business object ($BO_{OP,q}$) 302 includes fields 316, 318, 320. The first mapping includes a mapping of the data of data field A1 to the field 316 of the on-premise business object ($BO_{OP,q}$) 302 such that an $attribute_1$ populates the field 316 (e.g., the $attribute_1$ is based on the data of data field A1); a mapping of the data field A2 to the field 318 of the on-premise business object ($BO_{OP,q}$) 302 such that an $attribute_2$ populates the field 318 (e.g., the $attribute_2$ is based on the data of the data field A2); and a mapping of the data field A3 to the field 320 of the on-premise business object ($BO_{OP,q}$) 302 such that an $attribute_3$ populates the field 320 (e.g., the $attribute_3$ is based on the data of the data field A3).

In some examples, the second mapping can include a mapping between the on-premise business object ($BO_{OP,q}$) 302 and the on-demand business object ($BO_{OD,r}$) 304, and particularly, a mapping between the fields of the on-premise business object ($BO_{OP,q}$) and fields of the on-demand business object ($BO_{OD,r}$), according to one or more mapping rules.

For example, the on-demand business object ($BO_{OD,r}$) 304 includes fields 322, 324, 326. The second mapping includes a mapping of the field 316 of the on-premise business object ($BO_{OP,q}$) to the field 324 of the on-demand business object ($BO_{OD,r}$) 304 such that an $attribute_y$ populates the field 324 (e.g., the $attribute_y$ is based on the $attribute_1$); a mapping of the field 318 of the on-premise business object ($BO_{OP,q}$) 302 to the field 326 of the on-demand business object ($BO_{OD,r}$) 304 such that an $attribute_z$ populates the field 326 (e.g., the $attribute_z$ is based on the $attribute_2$); and a mapping of the field 320 of the on-premise business object ($BO_{OP,q}$) 302 to the field 322 of the on-demand business object ($BO_{OD,r}$) 304 such that an $attribute_x$ populates the field 322 (e.g., the $attribute_x$ is based on the $attribute_3$). In some examples, the attribute of the on-demand business object ($BO_{OD,r}$) 304 is substantially the same (or similar) to the attribute of the on-premise business object ($BO_{OP,q}$) 302 that it is associated with (e.g., $attribute_x$ is substantially the same as $attribute_3$; $attribute_y$ is substantially the same as $attribute_1$; $attribute_z$ is substantially the same as $attribute_2$).

In some examples, the third mapping can include a mapping between the on-demand business object ($BO_{OD,r}$) 304 and an on-demand database 328 (e.g., the on-demand database 120), and particularly, a mapping between the fields of the on-demand business object ($BO_{OD,r}$) 304 and the attributes of the on-demand database 328, according a second schema associated with the on-demand database 328. In some examples, the second schema differs from the first schema of the on-premise database 306.

Figure 4:
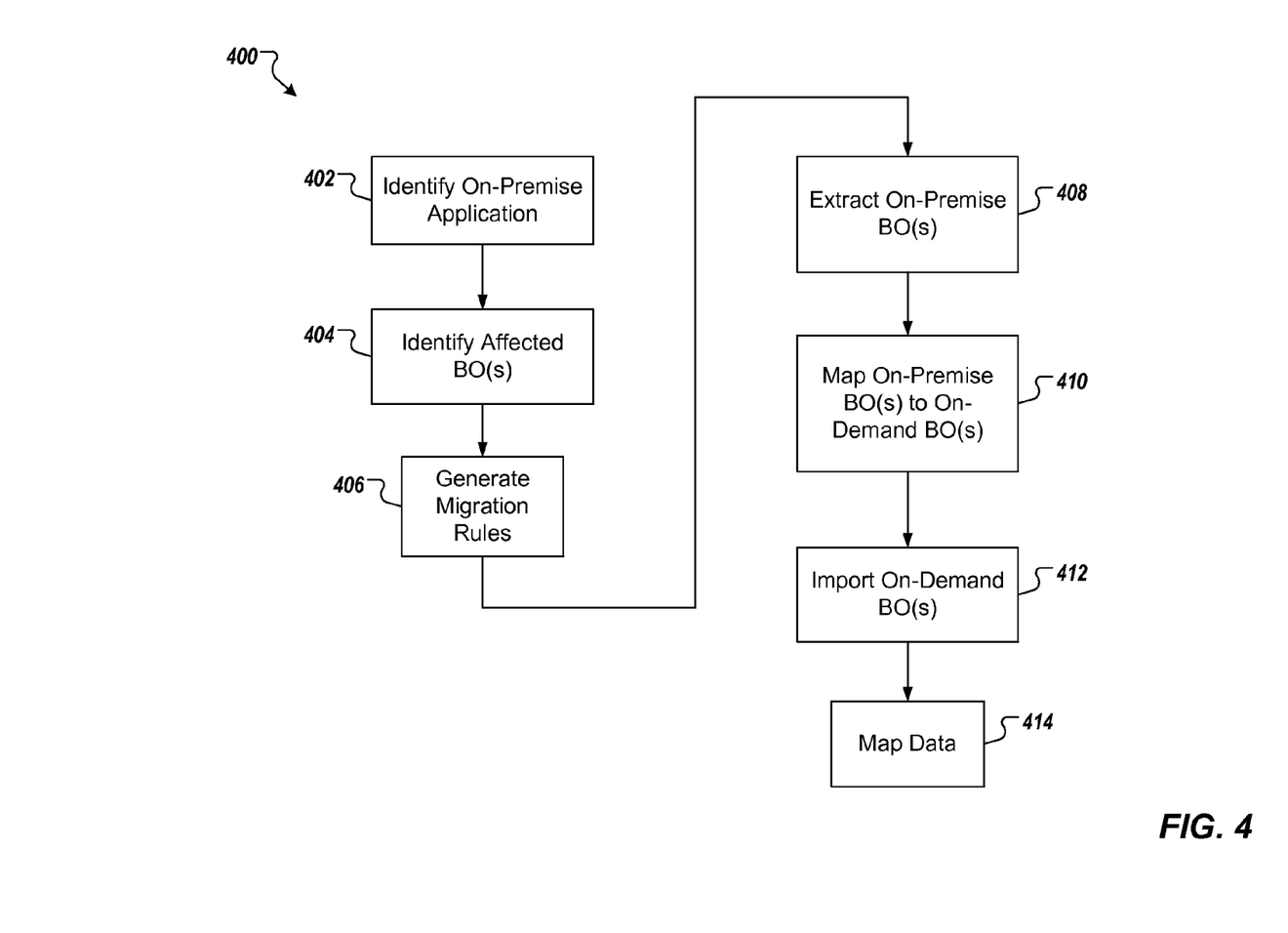
FIG. 4 illustrates a process in accordance with implementations of the present disclosure.

For example, the on-demand database 328 includes a data table 330 associated with the second schema. The table 330 includes data fields E1, E2, E3, F1, F2, F3, G1, G2, and G3. Each of the data fields can be associated with one more contents of data (e.g., attributes). The third mapping includes a mapping of the field 322 of the on-demand business object ($BO_{OD,r}$) 304 to the data field E1 such that $attribute_x$ is stored at data field E1 (e.g., the data of the data field E1 is based on the $attribute_x$); a mapping of the field 324 of the on-demand business object ($BO_{OD,r}$) 304 to the data field F2 such that $attribute_y$ is stored at data field F2 (e.g., the data of the data field F2 is based on the $attribute_y$); and a mapping of the field 326 of the on-demand business object ($BO_{OD,r}$) 304 to the data field G3 such that attribute is stored at data field G3 (e.g., the data of the data field G3 is based on the $attribute_z$);

FIG. 4 depicts an example process 400 for the migration of on-premise data objects to on-demand data objects. The example process 400 can be executed as one or more computer-executable programs executed using one or more computing devices. For example, the system 100 can execute the example process 400.

The on-premise application is identified (402). In some examples, the on-premise application includes an application that is to be supplanted by an on-demand application. For example, the on-premise application 106 of the on-premise environment 102 is identified. The identified on-premise application can embody a business process (e.g., the business process 200).

Affected BO(s) are identified (404). For example, on-premise BO(s) that are affected during execution of the on-premise application, and particularly, the business process underlying the on-premise application, are identified. For example, the on-premise business object ($BO_{OP,q}$) 302 that is associated with the on-premise application 106 can be identified.

Migration rules are generated (406). In some examples, the rules associated with migrating the identified on-premise BOs and the data associated therewith from the on-premise environment 102 to the on-demand environment are generated 104. For example, the rules can include rules relating to mappings between the on-premise database schema and the on-premise BO(s) (e.g., the on-premise business object ($BO_{OP,q}$) 302) according to the first schema, between the on-premise BO(s) (e.g., the on-premise business object ($BO_{OP,q}$) 302) and the on-demand BO(s) (e.g., the on-demand business object ($BO_{OD,r}$) 304), and between the on-demand BO(s) (e.g., the on-demand business object ($BO_{OD,r}$) 304) and the on-demand database schema according to the second schema.

The on-premise BO(s) are extracted (408). Specifically, the on-premise BO(s) that are identified (e.g., at 404) are extracted, and particularly, the attribute data associated with the on-premise BO(s) is extracted. For example, the BO extractor 110 extracts the identified BO(s) (e.g., the on-premise business object ($BO_{OP,q}$) 302) and attribute data (e.g., $attribute_1$, $attribute_2$, $attribute_3$) from the on-premise database 306.

In some implementations, the extraction of the on-premise BO(s) can be time-based. For example, a scheduling functionality may be applied to the extraction of the on-premise BO(s) such that the extraction occurs during specific time frames. Thus, during the extraction, the data of the on-premise database 306 associated with on-premise BO is "locked" (e.g., unaccessible or uneditable) to avoid inconsistencies of the data of the on-premise database 306. In some examples, the extraction can be split among one or more time frames.

The on-premise BO(s) are mapped to the on-demand BO(s) (410). Specifically, the fields of the extracted, on-premise BO(s) (e.g., at step 408) are mapped to the on-demand BO(s) by applying one or more of the generated migration rules (e.g., at step 406). Mapping of the fields between the on-premise BO(s) and the on-demand BO(s) (e.g., between fields 316, 318, 320 of the on-premise business object ($BO_{OP,q}$) 302 and the fields 322, 324, 326 of the on-demand business object ($BO_{OD,r}$) 304) includes mapping attributes associated with the fields of the on-premise BO(s) to the corresponding fields of the on-demand BO(s).

The on-demand BO(s) are imported (412). Specifically, the on-demand BO(s) is imported within the on-demand environment. For example, the BO importer 116 imports the on-demand BO(s) (e.g., the on-demand business object ($BO_{OD,r}$) 304) after mapping the on-premise BO(s) to the on-demand BO(s).

In some implementations, the importation of the on-demand BO(s) can be time-based. For example, a scheduling functionality may be applied to the importation of the on-premise BO(s) such that the importation occurs during specific time frames. Thus, during the importation, the data of the on-demand database is "locked" (e.g., unaccessible or uneditable) to avoid inconsistencies of the data of the on-demand database. In some examples, the importation can be split among one or more time frames.

The data associated with the on-demand BO(s) is mapped to the on-demand database (414). Specifically, the data (e.g., attributes) of the on-demand BO(s) is mapped to the on-demand database according to the second schema. For example, the BO importer 116 maps the fields of the on-demand BO (e.g., fields 322, 324, 326 of the on-demand business object ($BO_{OD,r}$) 304) to the on-demand database 328 such that the attributes associated with the fields are stored by the on-demand database 328 according to the second schema.

Figure 5:
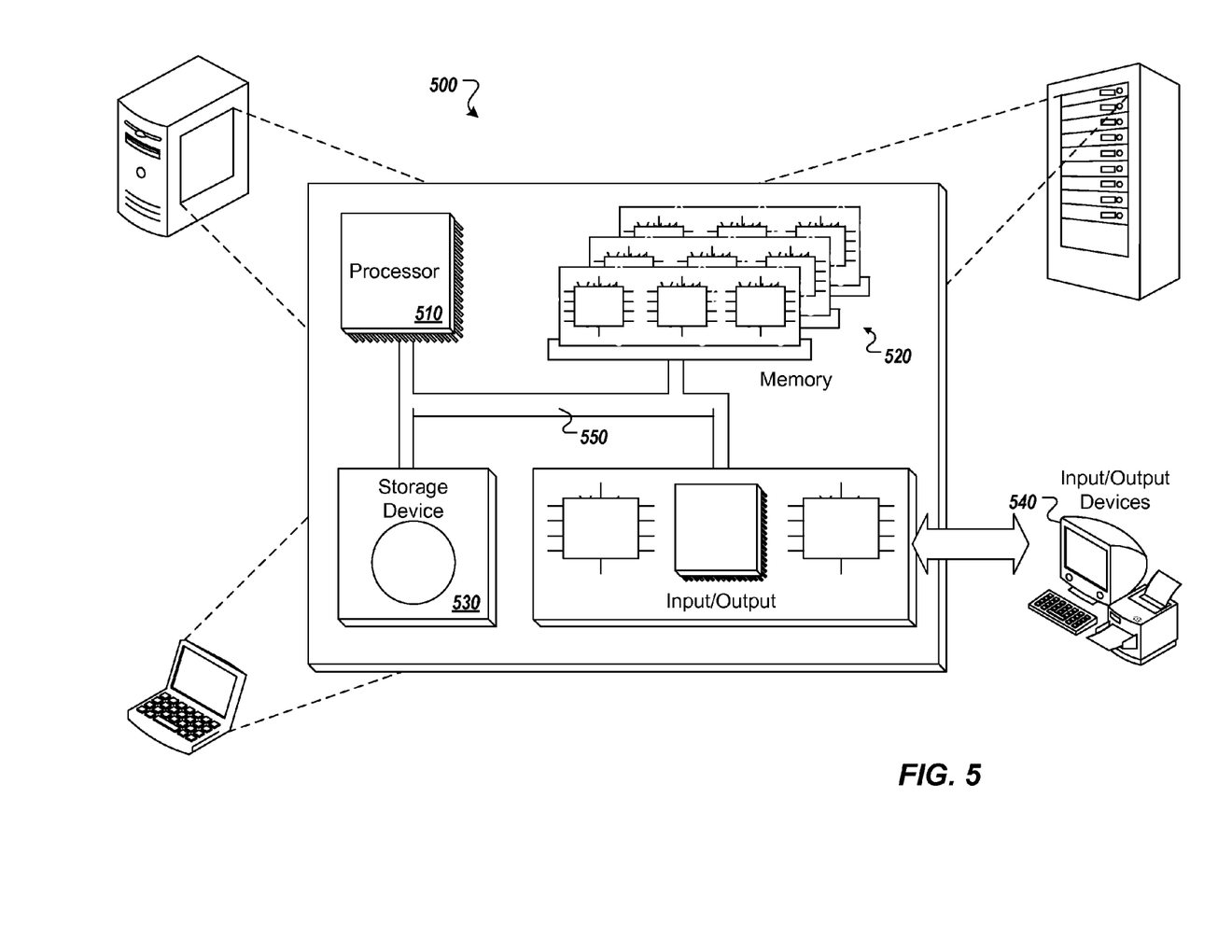
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer are a processor can include executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically migrating on-premise data objects to on-demand data objects, the method being executed using one or more processors and comprising:
   identifying a first mapping between an on-premise database and the on-premise data objects according to a first schema associated with the on-premise database, the on-premise database and the on-premise data objects used by an on-premise application that is executed within an on-premise computing environment;
   based on the first mapping, extracting, by the one or more processors, data corresponding to a subset of the on-premise data objects that are affected during execution of the on-premise application, the data being stored in the on-premise database;
   generating, by the one or more processors, an export file, the export file comprising the data;
   in response to and subsequent to identifying the first mapping, identifying, by the one or more processors, a second mapping between the subset of the on-premise data objects and the on-demand data objects;
   generating, by the one or more processors, an import file based on i) the export file and ii) the second mapping; and
   providing the import file to an on-demand computing environment that hosts an on-demand application, the import file being processable by the on-demand computing environment to write the data from the import file into an on-demand database, the on-demand database and the on-demand data objects used by the on-demand application that is executed within the on-demand computing environment, the on-demand data objects being affected during execution of the on-demand application,
   wherein the on-premise data objects are associated with an on-premise process executed by the on-premise application, the on-demand data objects are associated with an on-demand process executed by the on-demand application, and the on-demand process and the on-premise process provide a substantially same process result.

2. The method of claim 1, wherein generating the import file comprises:
   parsing the data provided in the export file; and
   mapping the data based on the second mapping.

3. The method of claim 1, wherein the second mapping is a mapping between fields of the subset of the on-premise data objects to fields of corresponding on-demand data objects.

4. The method of claim 1, wherein the first mapping maps fields of the on-premise database to fields of the on-premise data objects according to the first schema associated with the on-premise database.

5. The method of claim 1, farther comprising:
   identifying, by the one or more processors, a third mapping between the on-demand data objects and the on-demand database according to a second schema associated with the on-demand database; and
   based on the third mapping, storing the data of the export file to the on-demand database.

6. The method of claim 1, wherein the on-premise application embodies a business process of an enterprise, the business process comprising one or more tasks, at least one task affecting an on-premise data object.

7. The method of claim 1, wherein the on-premise computing environment is operated and maintained by an enterprise.

8. The method of claim 1, wherein the on-demand computing environment is operated and maintained by a service provider.

9. The method of claim 1, wherein an on-premise data object is affected during execution of the on-premise application when data is one or more of stored to and read from the on-premise data object.

10. The method of claim 1, wherein the on-premise computing environment is under control by an enterprise customer and physically accessible by the enterprise customer, and wherein the on-demand computing environment is independent of control by the enterprise customer and physically inaccessible by the enterprise customer.

11. The method of claim 1, wherein the on-demand application interacting with the on-demand data objects is same as the on-premise application interacting with the on-premise data objects.

12. The method of claim 1, wherein extracting data corresponding to a subset of the on-premise data objects comprises: during the extraction, locking data that is associated with the on-premise data objects and stored in the on-premise database.

13. A non-transitory computer-readable medium coupled to one or more processors having instructions stored thereon which, when executed by the one or more processors, cause the one or more processors to perform operations for automatically migrating on-premise data objects to on-demand data objects, the operations comprising:
   identifying a first mapping between an on-premise database and the on-premise data objects according to a first schema associated with the on-premise database, the on-premise database and the on-premise data objects used by an on-premise application that is executed within an on-premise computing environment;
   based on the first mapping, extracting, by the one or more processors, data corresponding to a subset of the on-premise data objects that are affected during execution of the on-premise application, the data being stored in the on-premise database;
   generating, by the one or more processors, an export file, the export file comprising the data;
   in response to and subsequent to identifying the first mapping, identifying, by the one or more processors, a second mapping between the subset of the on-premise data objects and the on-demand data objects;

generating, by the one or more processors, an import file based on i) the export file and ii) the second mapping; and providing the import file to an on-demand computing environment that hosts an on-demand application, the import file being process-able by the on-demand computing environment to write the data from the import file into an on-demand database, the on-demand database and the on-demand data objects used by the on-demand application that is executed within the on-demand computing environment, the on-demand data objects being affected during execution of the on-demand application, wherein the on-premise data objects are associated with an on-premise process executed by the on-premise application, the on-demand data objects are associated with an on-demand process executed by the on-demand application, and the on-demand process and the on-premise process provide a same process result.

14. The computer-readable medium of claim 13, wherein the operation of generating the import file comprises:

parsing the data provided in the export file; and mapping the data based on the second mapping.

15. The computer-readable medium of claim 13, wherein the second mapping is a mapping between fields of the subset of the on-premise data objects to fields of corresponding on-demand data objects.

16. The computer-readable medium of claim 13, wherein the first mapping maps fields of the on-premise database to fields of the on-premise data objects according to the first schema associated with the on-premise database.

17. A system, comprising:

one or more processors; and a non-transitory computer-readable medium coupled to the one or more processors having instructions stored thereon which, when executed by the one or more processors, cause the one or more processors to perform operations for automatically migrating on-premise data objects to on-demand data objects, the operations comprising:

identifying a first mapping between an on-premise database and the on-premise data objects according to a first schema associated with the on-premise database, the on-premise database and the on-premise data objects used by an on-premise application that is executed within an on-premise computing environment;

based on the first mapping, extracting, by the one or more processors, data corresponding to a subset of the on-premise data objects that are affected during execution of the on-premise application, the data being stored in the on-premise database;

generating, by the one or more processors, an export file, the export file comprising the data;

in response to and subsequent to identifying the first mapping, identifying, by the one or more processors, a second mapping between the subset of the on-premise data objects and the on-demand data objects;

generating, by the one or more processors, an import file based on i) the export file and ii) the second mapping; and providing the import file to an on-demand computing environment that hosts an on-demand application, the import file being process-able by the on-demand computing environment to write the data from the import file into an on-demand database, the on-demand database and the on-demand data objects used by the on-demand application that is executed within the on-demand computing environment, the on-demand data objects being affected during execution of the on-demand application, wherein the on-premise data objects are associated with an on-premise process executed by the on-premise application, the on-demand data objects are associated with an on-demand process executed by the on-demand application, and the on-demand process and the on-premise process provide a same process result.

18. The system of claim 17, wherein the operation of generating the import file comprises:

parsing the data provided in the export file; and mapping the data based on the second mapping.

19. The system of claim 17, wherein the second mapping is a mapping between fields of the subset of the on-premise data objects to fields of corresponding on-demand data objects.

20. The system of claim 17, wherein the first mapping maps fields of the on-premise database to fields of the on-premise data objects according to the first schema associated with the on-premise database.

* * * * *